United States Patent [19]
Andersson et al.

[11] Patent Number: 6,065,510
[45] Date of Patent: *May 23, 2000

[54] FILL SYSTEM FOR PRIMARY AND SECONDARY PRODUCTS

[75] Inventors: Sven-Arne Andersson, Veberöd, Sweden; Bent Olufesen, Oslo, Norway; Niclas Heinemyr, Malmö, Sweden; Arde Kirka, Schaumburg, Ill.

[73] Assignee: Tetra Laval Holdings & Finance, SA, Pully, Switzerland

[ * ] Notice: This patent is subject to a terminal disclaimer.

[21] Appl. No.: 08/742,944

[22] Filed: Oct. 31, 1996

Related U.S. Application Data

[63] Continuation-in-part of application No. 08/315,246, Sep. 29, 1994, abandoned.
[60] Provisional application No. 60/007,238, Nov. 3, 1995.

[51] Int. Cl.[7] ........................................... A23C 9/14
[52] U.S. Cl. ............................ 141/105; 141/104; 141/90; 141/392; 426/586
[58] Field of Search .................... 141/9, 82, 90, 141/91, 104–107, 392; 53/237, 474; 428/586; 222/64

[56] References Cited

U.S. PATENT DOCUMENTS

| | | | |
|---|---|---|---|
| 2,613,023 | 10/1952 | Reich | 141/20 |
| 3,267,971 | 8/1966 | Mueller | 141/9 |
| 3,908,719 | 9/1975 | Berg et al. | 141/82 |
| 4,450,981 | 5/1984 | Haig | 222/64 |
| 4,964,444 | 10/1990 | Hanerus et al. | 141/90 |
| 4,966,205 | 10/1990 | Tanaka | 141/9 |
| 5,009,339 | 4/1991 | Hanerus et al. | 222/380 |
| 5,090,594 | 2/1992 | Randall, Jr. et al. | 222/64 |
| 5,133,391 | 7/1992 | Johansson et al. | 141/9 |
| 5,339,875 | 8/1994 | English et al. | 141/9 |

*Primary Examiner*—J. Casimer Jacyna
*Attorney, Agent, or Firm*—Welsh & Katz, Ltd.

[57] ABSTRACT

A fill system for use in a packaging machine for filling a container with a primary product and a secondary product is provided. The fill system includes a primary intermediate storage tank. The storage tank has an inlet connected to a source of the primary product and an outlet. The fill system also has a primary fill pipe having an inlet and an outlet, the outlet overlying a container processing path along which containers are filled and sealed by the packaging machine. A primary pump is also provided for pumping a predetermined amount of the primary product from the outlet of the primary intermediate storage tank to the inlet of the primary fill pipe. Similarly, a secondary intermediate storage tank having an inlet connected to a source of the secondary product is provided. The secondary fill pipe is concentrically disposed in the primary fill pipe and has an outlet overlying the container processing path. In addition, a secondary pump is provided for pumping a predetermined amount of the secondary product from an outlet of the secondary intermediate storage tank to the secondary fill pipe.

12 Claims, 14 Drawing Sheets

FILL SYSTEM FOR PRIMARY AND SECONDARY PRODUCTS

CROSS-REFERENCE TO RELATED APPLICATIONS

This application is a continuation-in-part of U.S. patent application Ser. No. 08/315,246 filed Sep. 29, 1994, now abandoned, and claims the priority benefit of provisional application Ser. No. 60/007,238 filed Nov. 3, 1995.

STATEMENT REGARDING FEDERALLY SPONSORED RESEARCH OR DEVELOPMENT

Not Applicable

BACKGROUND OF THE INVENTION

The present system relates to a fill system that is used to dispense both a primary and a secondary product into a container in a filling machine. One such machine is disclosed in U.S. Ser. No. 08/315,246, filed Sep. 29, 1994, entitled "Packaging Machine System For Filling Primary And Secondary Products Into A Container," which is hereby incorporated by reference.

The specific embodiment of the system illustrated in the foregoing patent application receives a continuous supply of primary and secondary products from storage tanks within, for example, a dairy. There are, however, limitations imposed upon the filling speed of this configuration. It is possible to generate undesirable air bubbles in the system and product with the illustrated configuration. It is therefore desirable to improve on the foregoing system to increase filling speed and reliability, as well as to increase the performance of the system during routine operations such as cleaning and draining.

BRIEF SUMMARY OF THE INVENTION

A fill system for use in a packaging machine for filling a container with a primary product and a secondary product is provided. The fill system comprises primary and secondary filling systems. The primary system has a primary intermediate storage tank with an inlet connected to a source of the primary product and an outlet. The primary fill system also has a primary fill pipe having an inlet and an outlet, the outlet overlying a container processing path along which containers are filled and sealed by the packaging machine. A primary pump means is also provided for pumping a predetermined amount of the primary product from the outlet of the primary intermediate storage tank to the inlet of the primary fill pipe.

Similarly, the secondary filling system has a secondary intermediate storage tank with an inlet connected to a source of the secondary product. The secondary fill pipe is concentrically disposed in the primary fill pipe and has an outlet overlying the container processing path. In addition, secondary pump means are provided for pumping a predetermined amount of the secondary product from an outlet of the secondary intermediate storage tank to the secondary fill pipe.

DETAILED DESCRIPTION OF THE INVENTION

Figure 1:
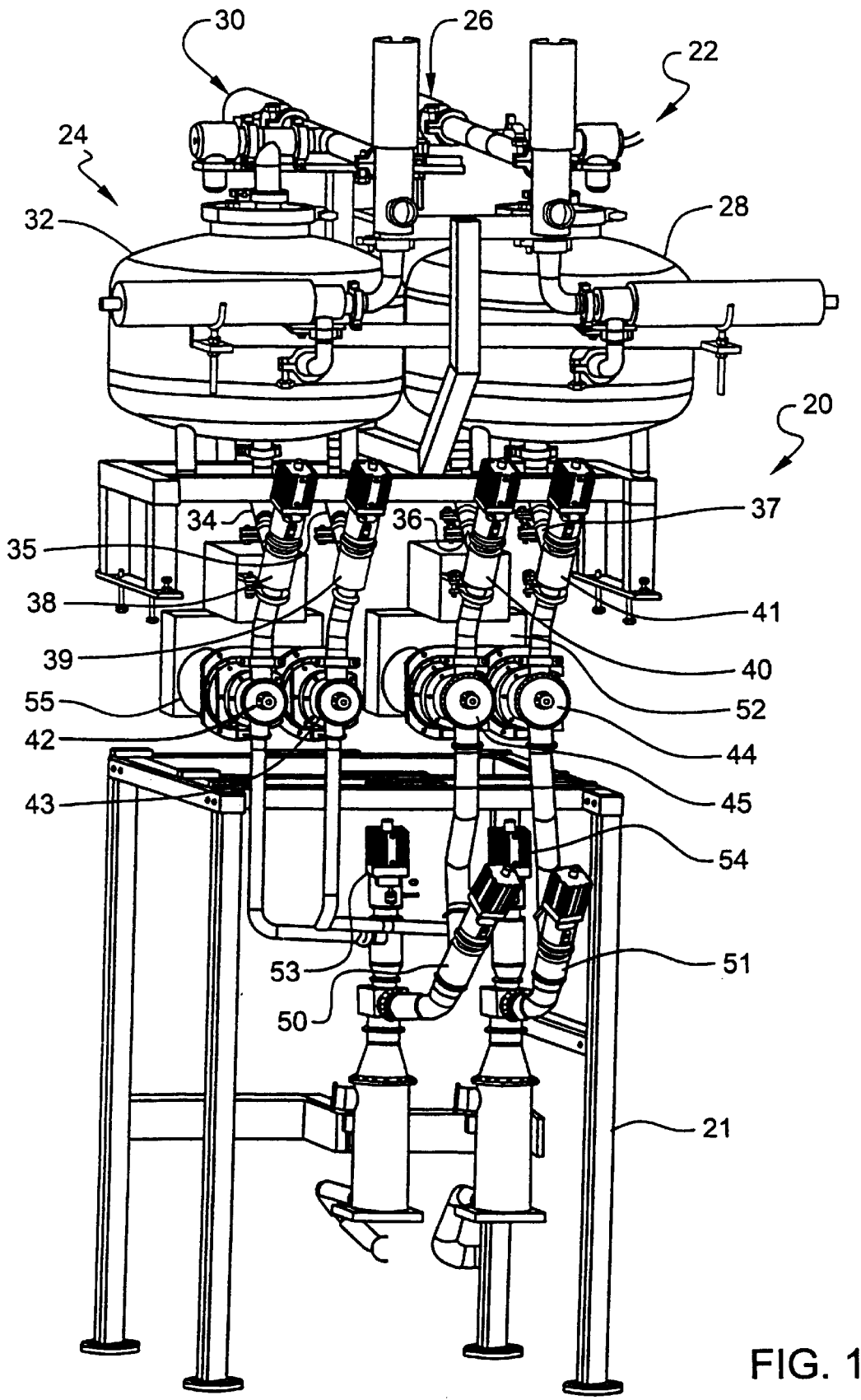
FIG. 1 is a perspective view of the mechanical components of an assembled fill system.

FIG. 1 is a perspective view of the various components of one embodiment of a fill system referenced generally at 20. The illustrated fill system 20 includes two parallel filling stations that overlie respective parallel container processing paths along which respective lines of containers are filled and sealed. Each of the filling stations dispense a primary and secondary product into each of the containers as the containers are transported along their respective container processing paths. The fill system 20 can be mounted to a support frame 21. Although two separate filling stations are illustrated, a single filling station is also contemplated as being suitable for use in a packaging machine.

The fill system 20 has a primary product fill system 22 and a secondary product fill system 24. The primary product fill system 22 includes a primary product inlet 26 for accepting a primary product, such as skim milk, from a primary product storage tank (not illustrated) into a primary intermediate storage tank 28. A secondary product inlet 30 is connected to accept a secondary product, such as cream, from a secondary product storage tank (not illustrated) into a secondary intermediate storage tank 32.

The intermediate storage tanks 32, 28 have respective outlets 34, 35 and 36, 37. The outlets 34–37 from the intermediate storage tanks 28, 32 are in fluid communication with respective valves 38, 39 and 40, 41 which, for example, are inclined at an angle of approximately 30 degrees. Valves 38, 39 control the flow of the fluid in the secondary intermediate tank 32 to a pair of secondary dual piston pumps 42, 43.

Similarly, valves 40, 41 control the flow of the fluid in the primary intermediate tank 28 to a pair of primary dual piston pumps 44, 45. The flows of fluid from the primary system pumps 44, 45 to outlet nozzles 48A, 49A (see FIG. 2) are controlled by respective valves 50 and 51 that, for example, are inclined at an angle of 45 degrees. The primary system 22 also includes a pump motor 52.

The flows of fluid from the secondary system pumps 42, 43 to the outlet nozzles 48B, 49B are controlled by respective valves 53 and 54. The secondary system 24 similarly includes a pump motor 55.

The valves may be constructed in accordance with one or more of the teachings of U.S. Pat. Nos. 3,643,679; 4,913,185; and European Patent 191 192B1. To ensure hygenic operation of the system, each of the valves may be connected to a vacuum generator which vacuum isolates several of the valves moving components from the valve chamber. The pumps may include a piston-diaphragm assembly such as the one described in provisional application 60/006,175, entitled "Piston-Diaphragm Assembly" (Attorney Docket No. 11342US01), filed Nov. 2, 1995, and included in its entirety herein by reference.

All of the various illustrated product conducting pipes that are utilized in the fill system may be inclined. As such, the tasks of draining the system and, further, eliminating air bubbles in the system as it is filled, become easier to implement.

The fill system 20 may be used to replace a single product fill system used in an existing packaging machine. In such instance, it is desirable to provide the support frame 21 as a component of the overall fill system 20. For example, the illustrated fill system 20 may be mounted for use in a packaging machine such as Model TR/7 currently available from Tetra Rex Packaging Systems, Inc. of Buffalo Grove, Ill.

Figure 2:
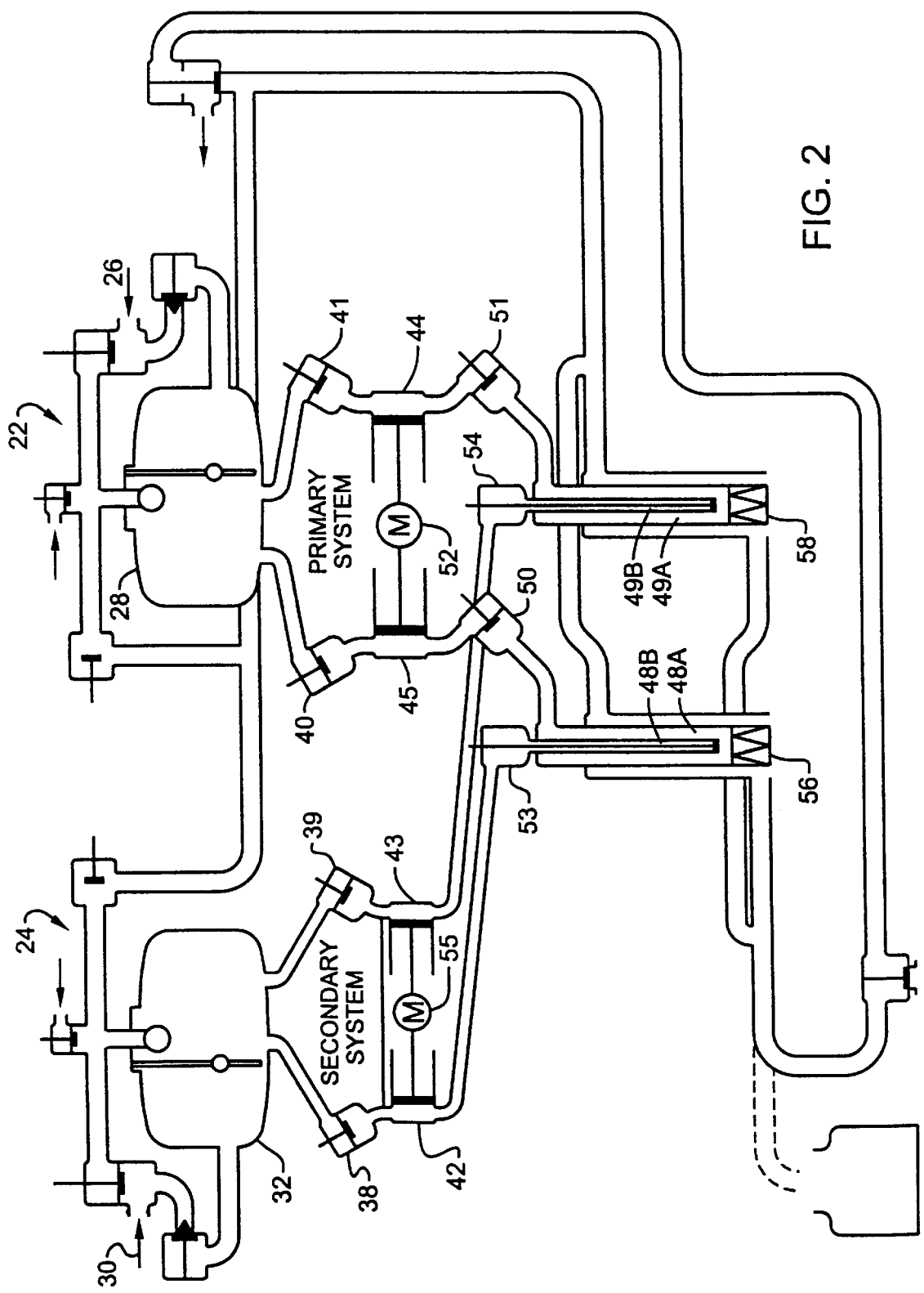
FIG. 2 is a schematic illustration of the system configuration during a pre-heating operation during which the sealing nozzles of a packaging machine including the present system are heated prior to initiating form, fill, and seal operations of the packaging machine.

FIG. 2 is a schematic illustration of the fill system 20 configuration during a pre-heating operation. During this operation, sealing nozzles 56, 58 of a packaging machine including the present system are heated prior to initiating form, fill, and seal operations of the packaging machine. In the configuration, all of the valves in the system are in a closed state. The valves are preferably held in position by a respective spring without air pressure.

Figure 3:
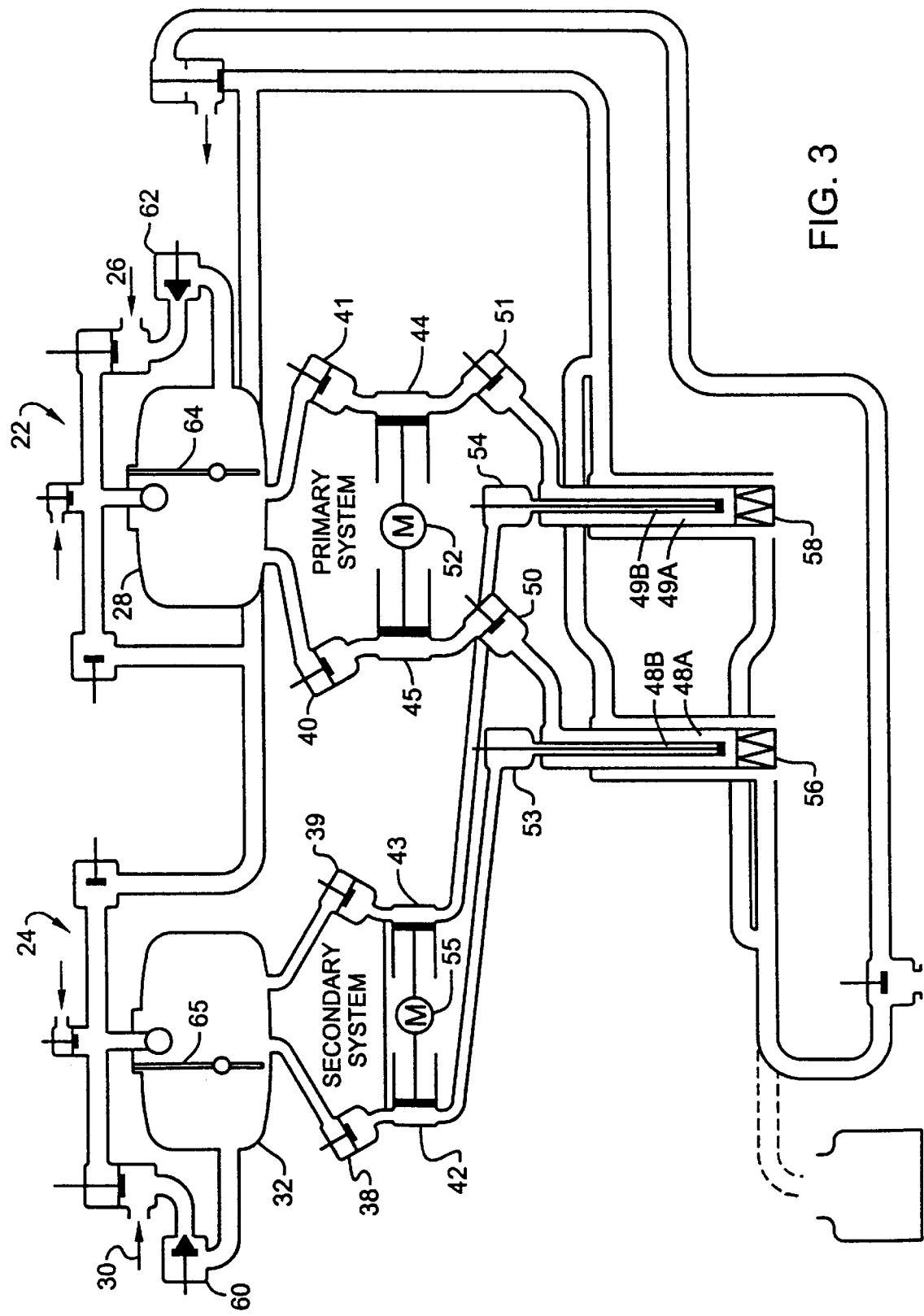
FIGS. 3–5 are schematic illustrations of the system configurations during initial filling of the system with primary and secondary products.
Figure 4:
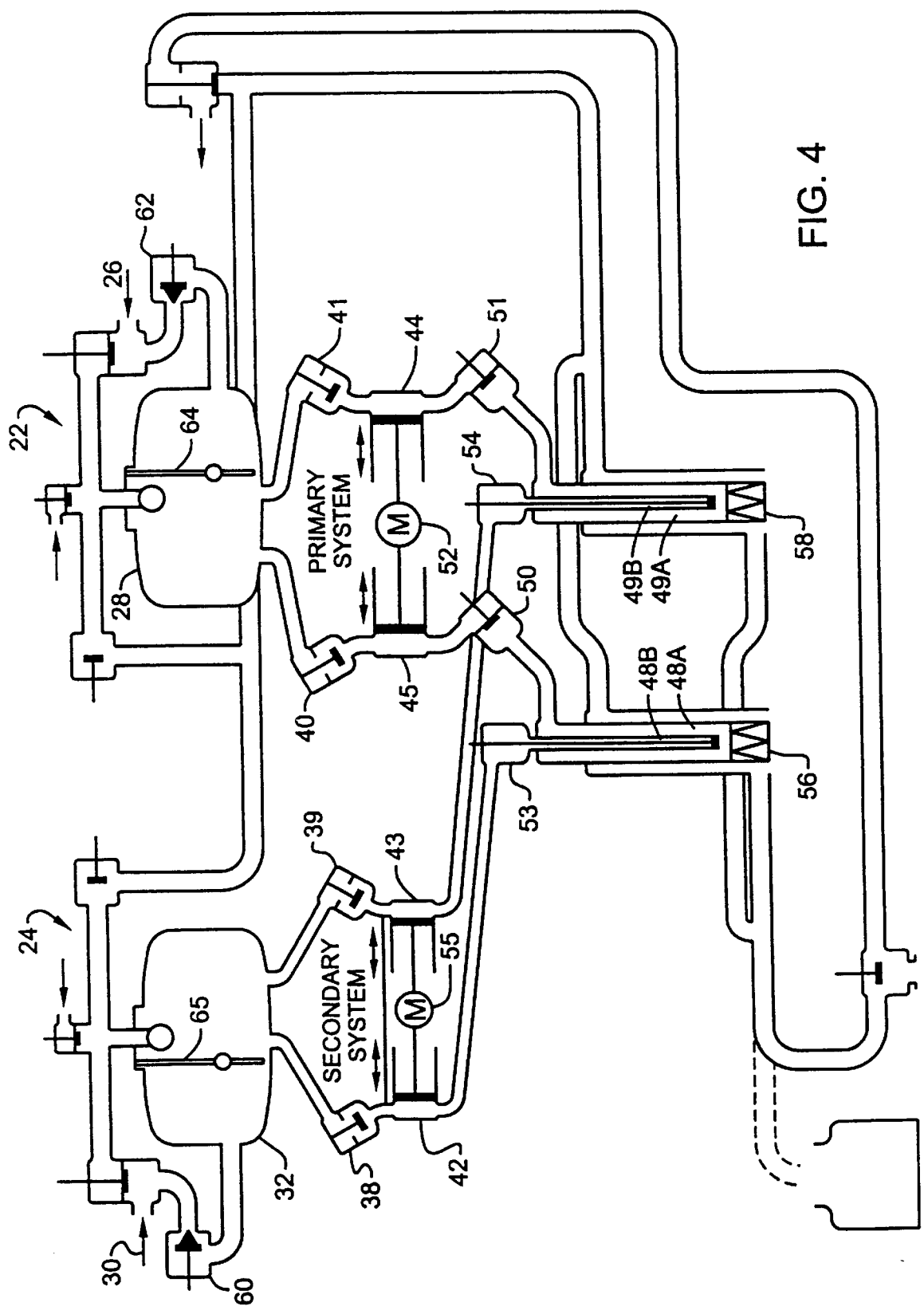
Figure 5:
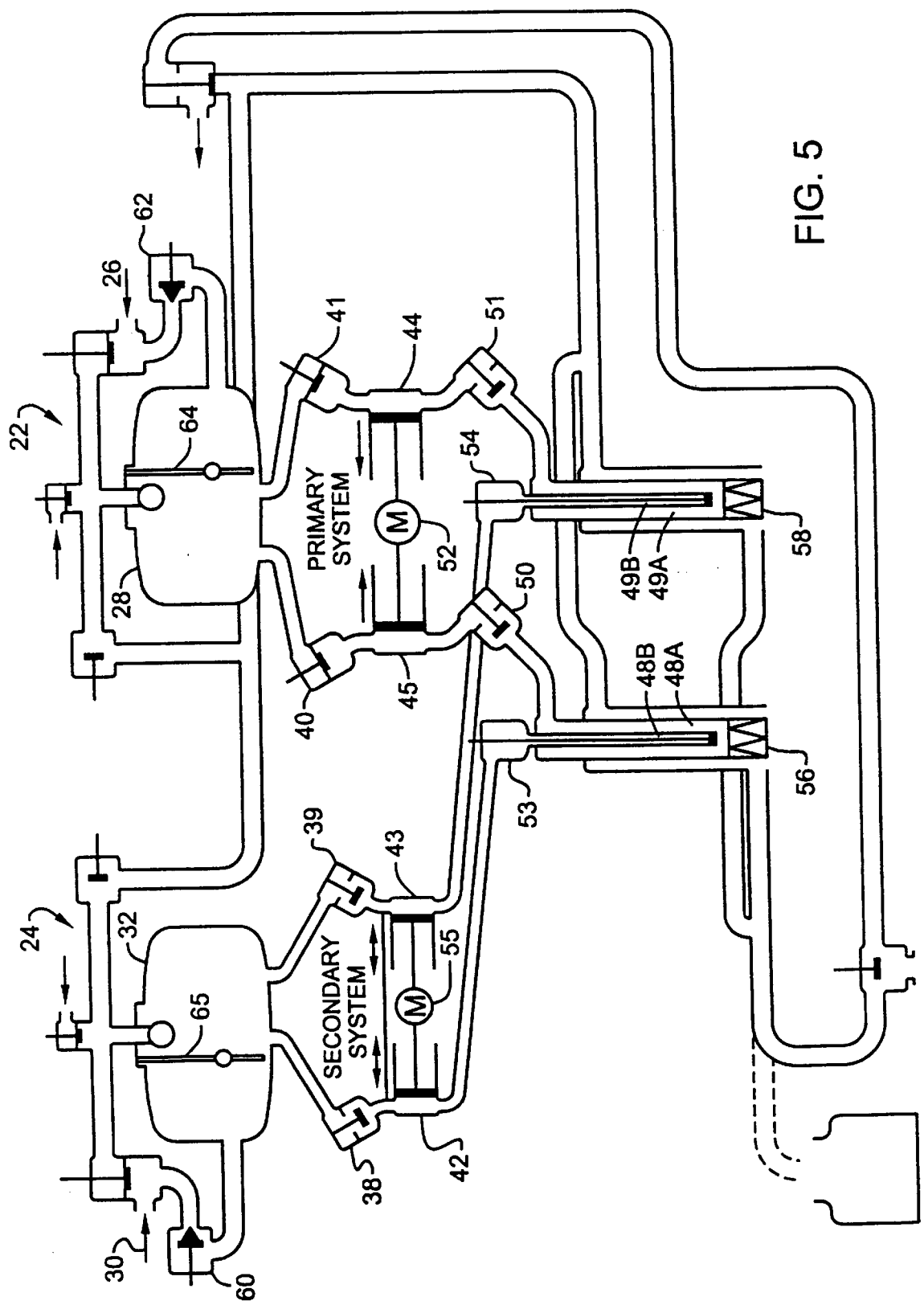

FIGS. 3–5 are schematic illustrations of the system configurations during initial filling of the system with primary and secondary products. As illustrated in FIG. 3, the secondary product is supplied through the secondary product inlet 30. Valve 60 is opened to allow the secondary product to flow and fill the secondary intermediate tank 32 of the secondary system 24. Valves 38 and 39 are closed to prevent drainage of the secondary product from the secondary intermediate tank 32.

Primary product is allowed to flow through the primary product inlet 26, through valve 62 and into the primary intermediate storage tank 28 of the primary system 22. Valves 40 and 41 are closed to prevent drainage of the primary product from the intermediate tank 28. The states of valves 62 and 60 are controlled based on the level of the product in the respective intermediate tanks 28, 32, as sensed by respective level probes 64, 65.

After the primary and secondary products have reached the desired levels in the respective intermediate tanks, valves 38, 39, 40 and 41 are opened to facilitate further flow of the products through the respective systems 22, 24. This step is illustrated in FIG. 4. Flow of the products is enhanced by operation of the pump motors 52, 55 of the primary and secondary product systems 22, 24. Finally, the remaining portions of the system are filled when valves 50 and 51 are opened, as illustrated in FIG. 5, during which time the pumps 44, 45 of the primary system 22 are operated to create a suction force to prevent the flexible polymer sealing nozzles 56, 58 from opening.

Figure 6:
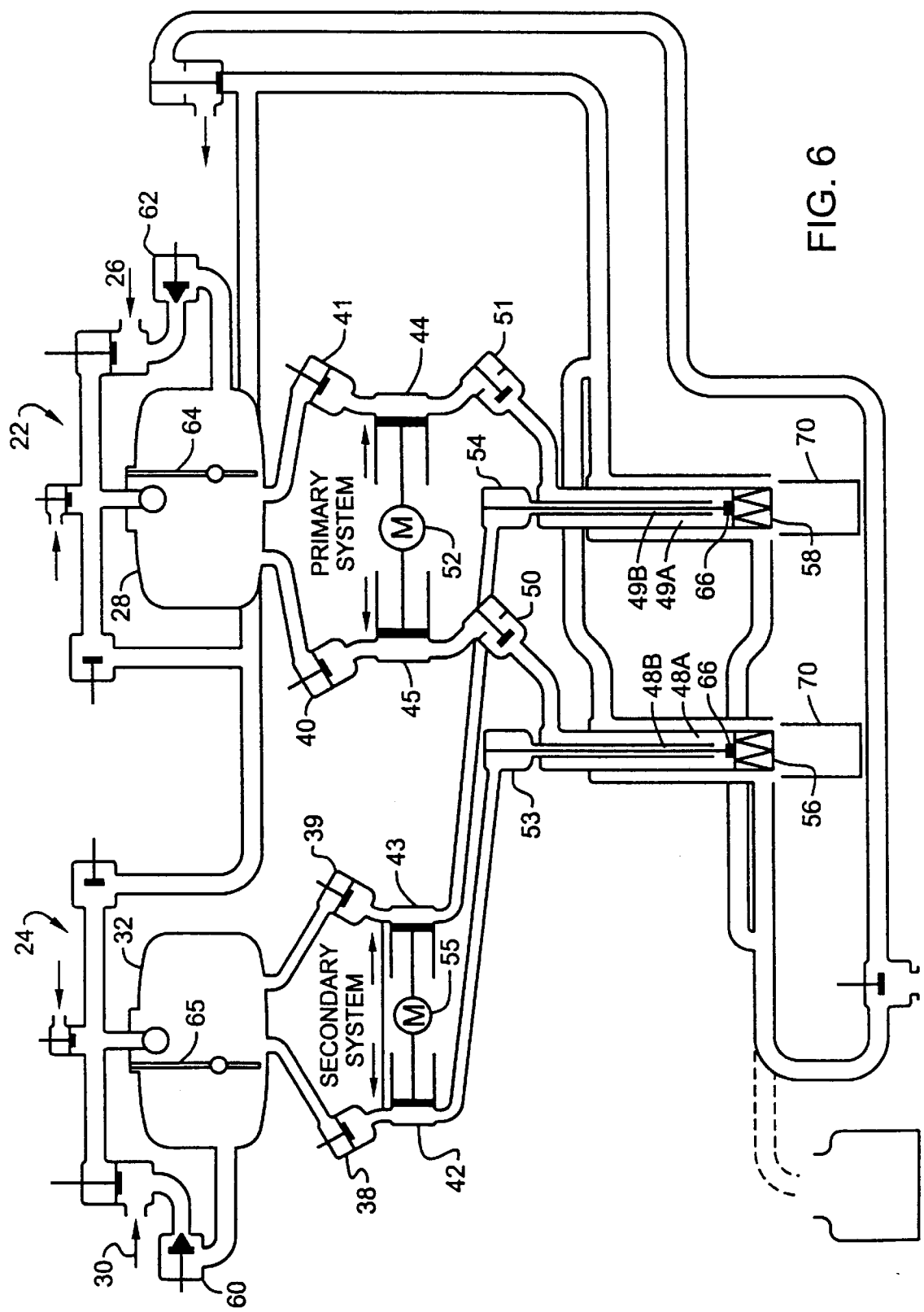
FIGS. 6 and 7 are schematic illustrations of the system configurations during which the product is suctioned from the intermediate tanks and dispensed into a container.
Figure 7:
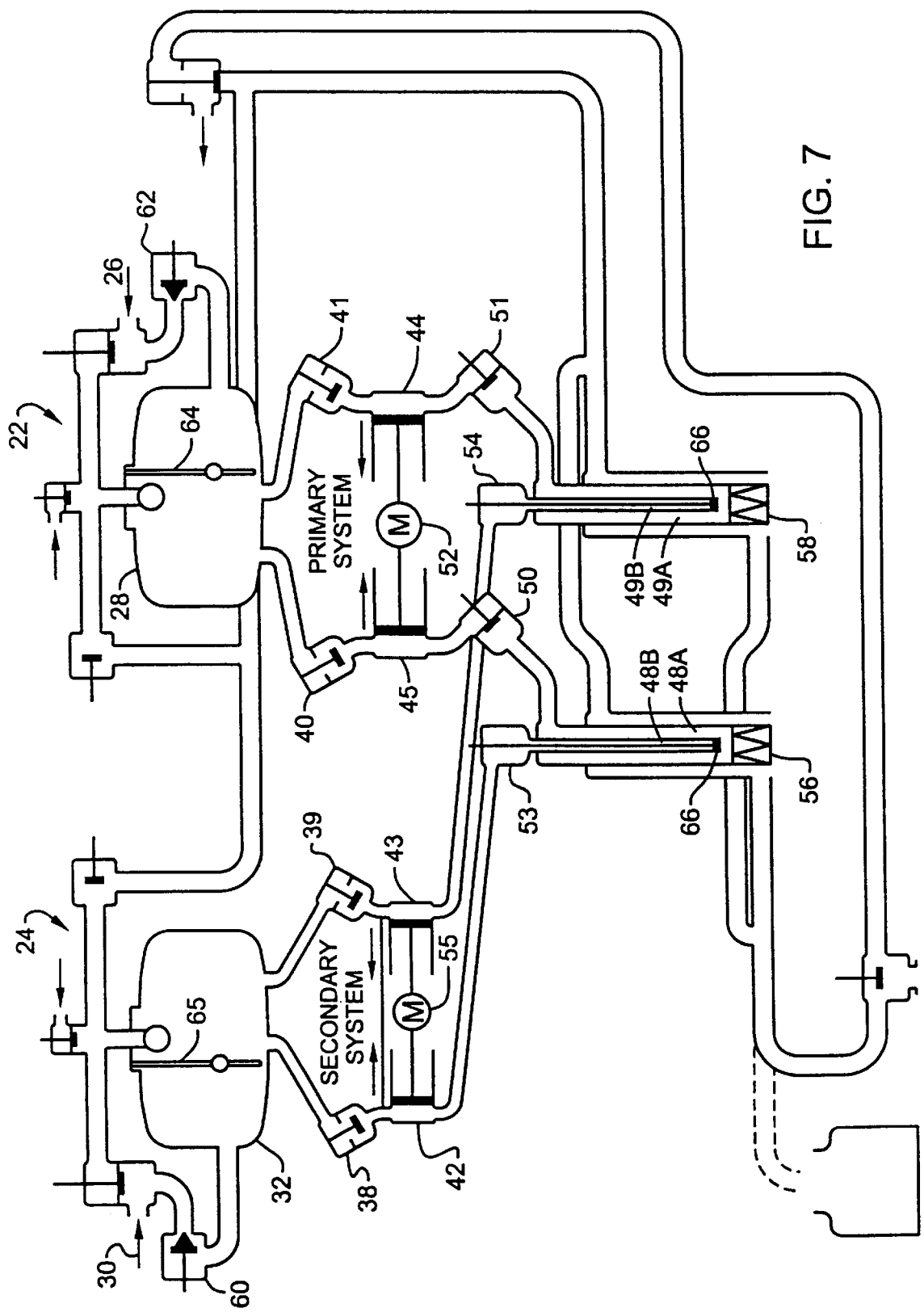

FIGS. 6 and 7 are schematic illustrations of the system configurations during which the product is suctioned from the intermediate tanks 28, 32 and dispensed into a container 70. During production suction and filling, the level probes 64, 65 in the intermediate tanks 28, 32 are operated to control the level of the secondary and primary products in the respective intermediate tank 28 or 32. As shown in FIG. 6, valves 50, 51 are opened to allow flow of the primary product. Also, valves 53, 54 operate to open a sealing member 66 thereby controlling the flow of the secondary product through the secondary fill tubes 48B, 49B.

Thus, the system 20 provides non-turbulent liquid product filling of containers due to the intermediate storage tanks 28, 32 and the associated valving control. This is an advantage over prior systems in which the flow of product was direct from a source. As a result, the filling operation of the product was turbulent. The system 20 also reduces product wastage since the products from the intermediate storage tanks 28, 32 can be drained more completely.

Figure 8:
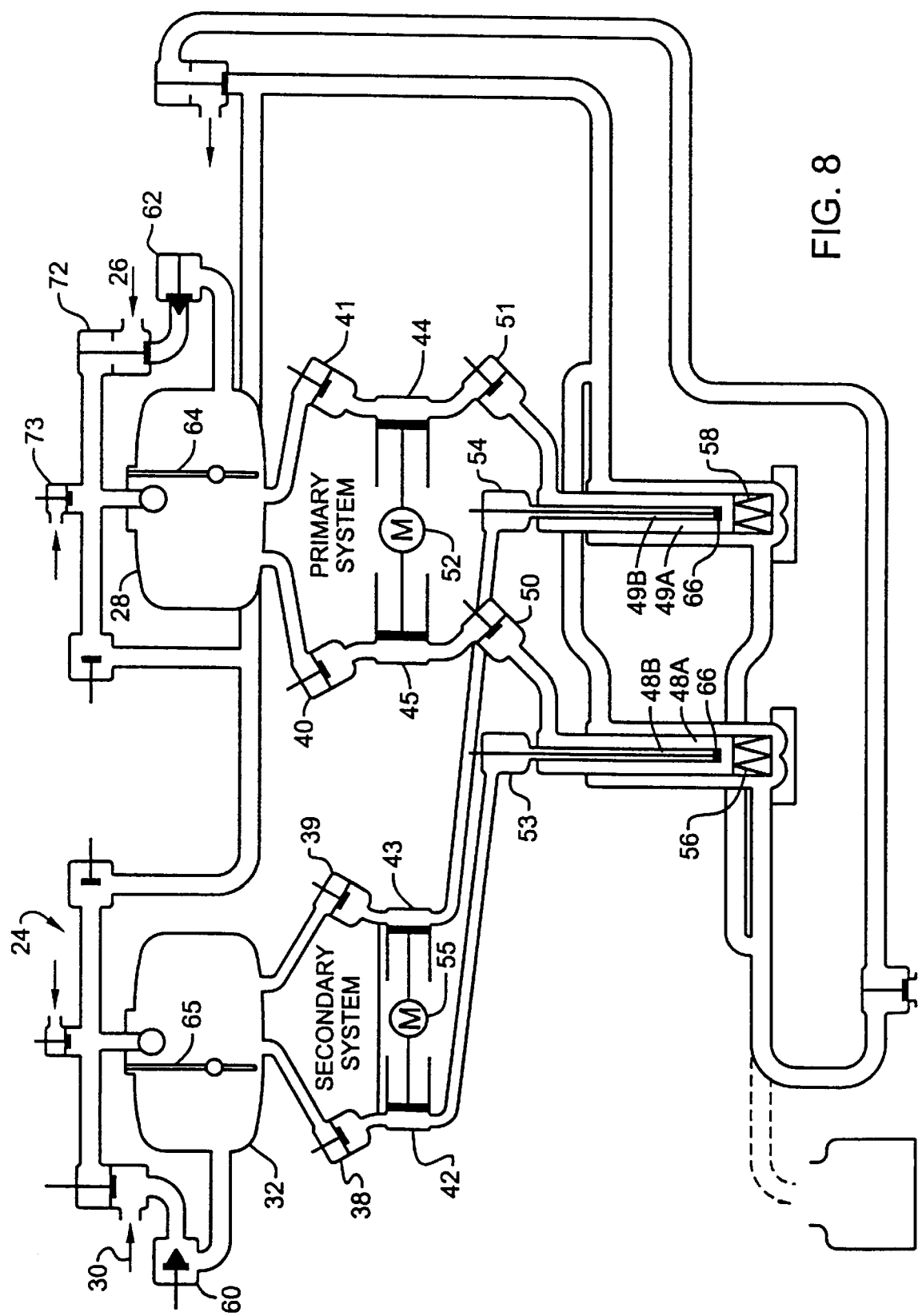
FIGS. 8–11 are schematic illustrations of the system configurations during which a cleaning fluid is circulated through the system.
Figure 9:
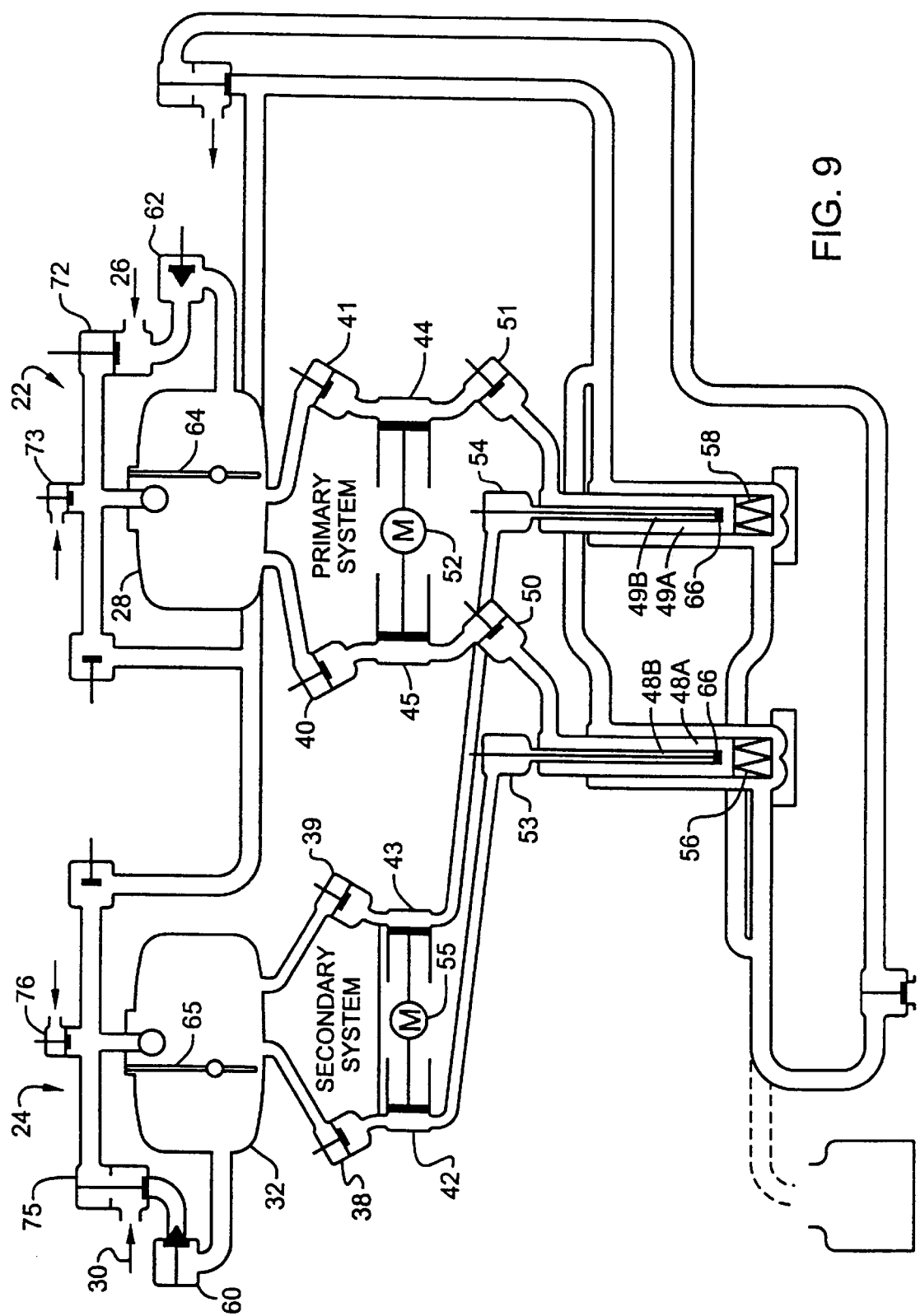

FIGS. 8–11 are schematic illustrations of the system configurations during which a cleaning fluid is circulated through the system. During circulation step A, as illustrated in FIG. 8, cleaning fluid is introduced into the secondary intermediate tank 32 of the secondary system 24, while cleaning fluid is also introduced through valve 72 to clean valve 73 when valve 73 is briefly opened ("flipped"). During circulation step B, as illustrated in FIG. 9, cleaning fluid is introduced into the primary intermediate tank 28 of the primary system 22, while cleaning fluid is also introduced through valve 75 to clean valve 76 when valve 76 is briefly opened ("flipped").

Figure 10:
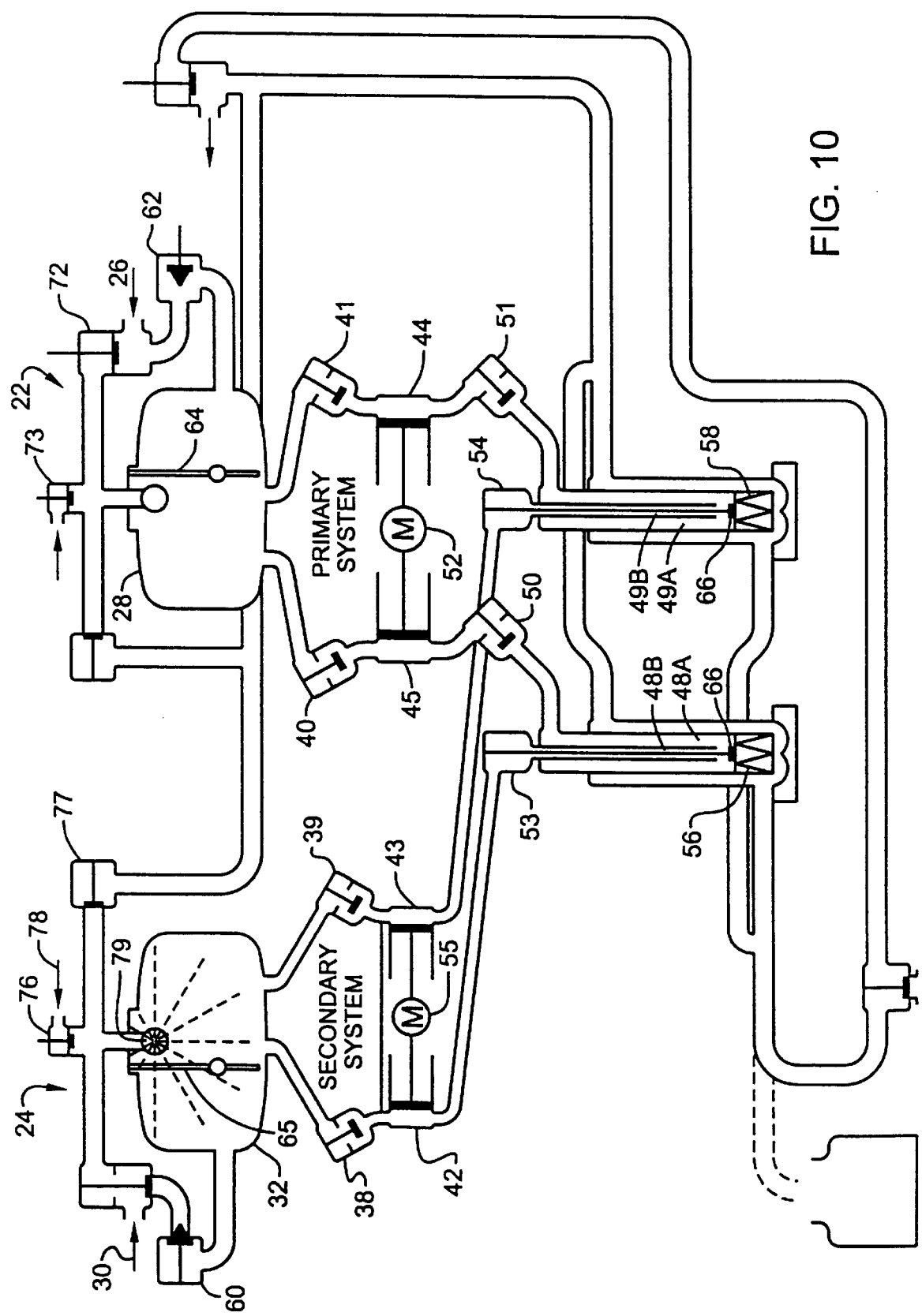

The secondary system 24 is cleaned in the configuration shown as circulation step C of FIG. 10. During this operation, the states of valves 76 and 77 are dependent on the level of cleaning fluid in the intermediate tank 32 of the secondary system 24. More particularly, valve 76 is operated to introduce pressurized sterile air 78 into the secondary intermediate tank 32 through a ball nozzle 79 along with the cleaning fluid when the level of cleaning fluid in the secondary intermediate tank 32 exceeds a predetermined level. The introduction of the pressurized sterile air 78 into the secondary intermediate tank 32 facilitates faster circulation and drainage of the cleaning fluid through and from the secondary system 24.

Figure 11:
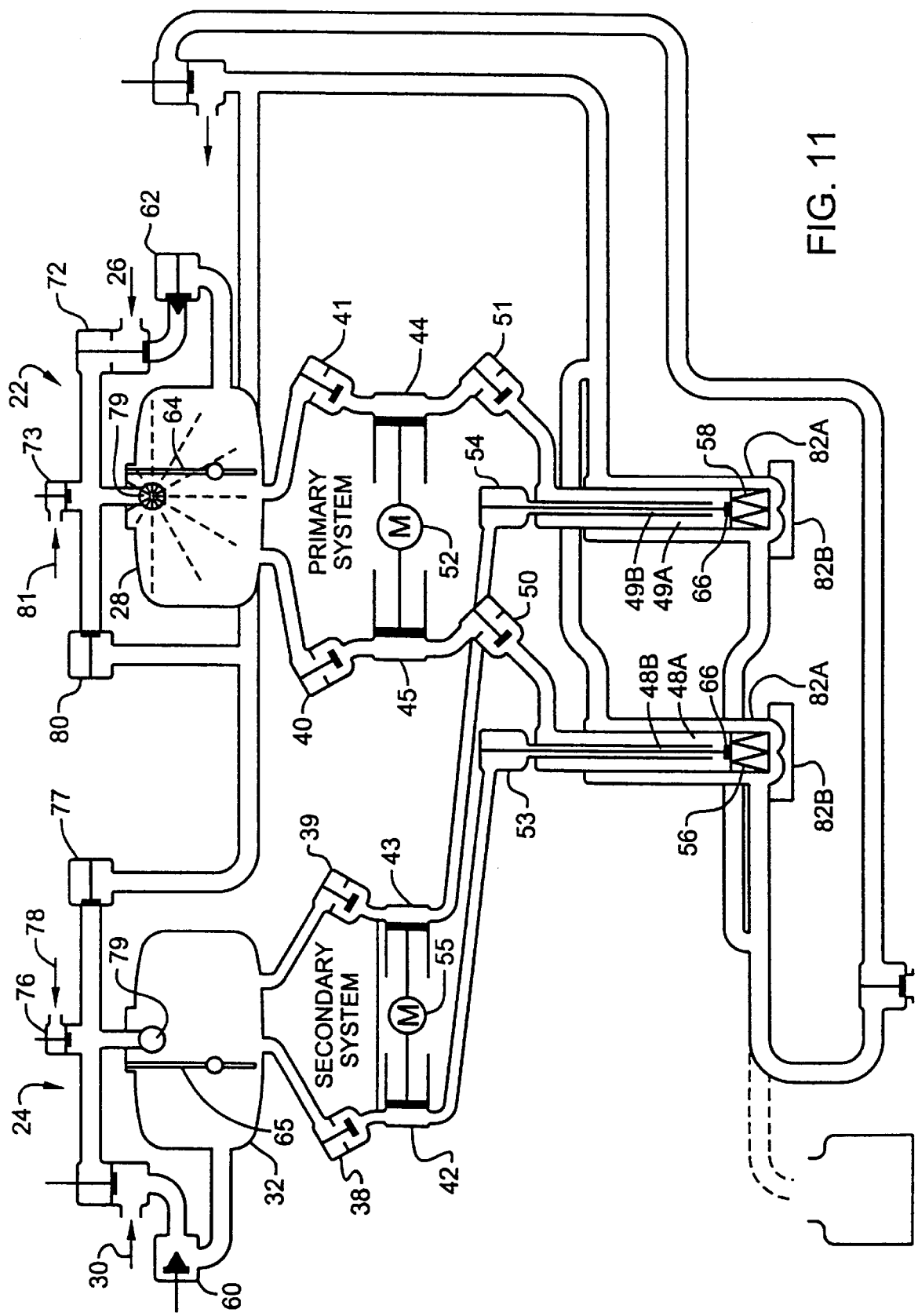

Similarly, the primary system 22 is cleaned in the configuration shown as circulation step D in FIG. 11. During this operation, the states of valves 73 and 80 are dependent on the level of cleaning fluid in the intermediate tank 28 of the primary system 22. Pressurized sterile air 81 is introduced through valve 73.

Figure 12:
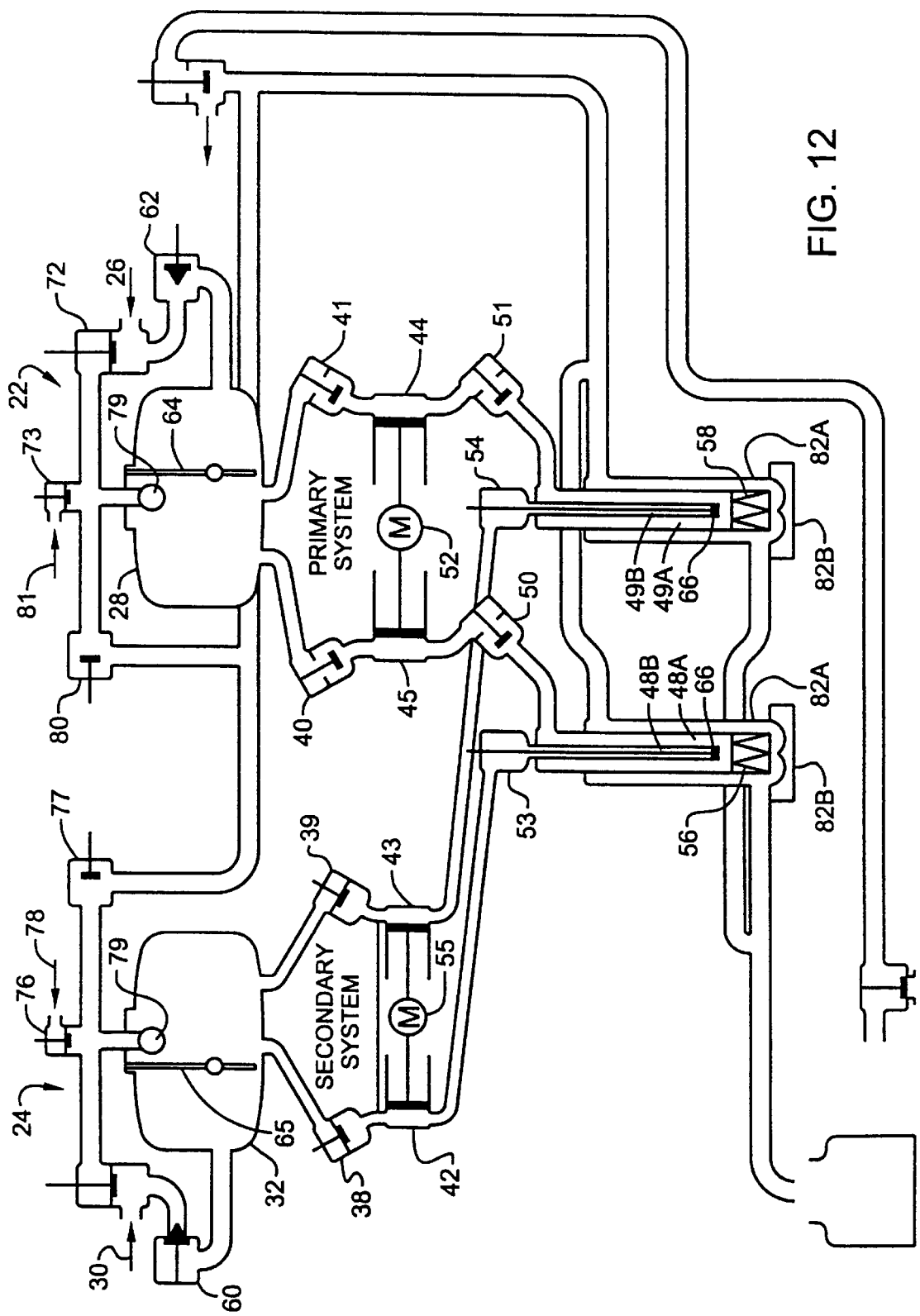
FIGS. 12–14 are schematic illustrations of the system configurations that are utilized during various draining processes.
Figure 13:
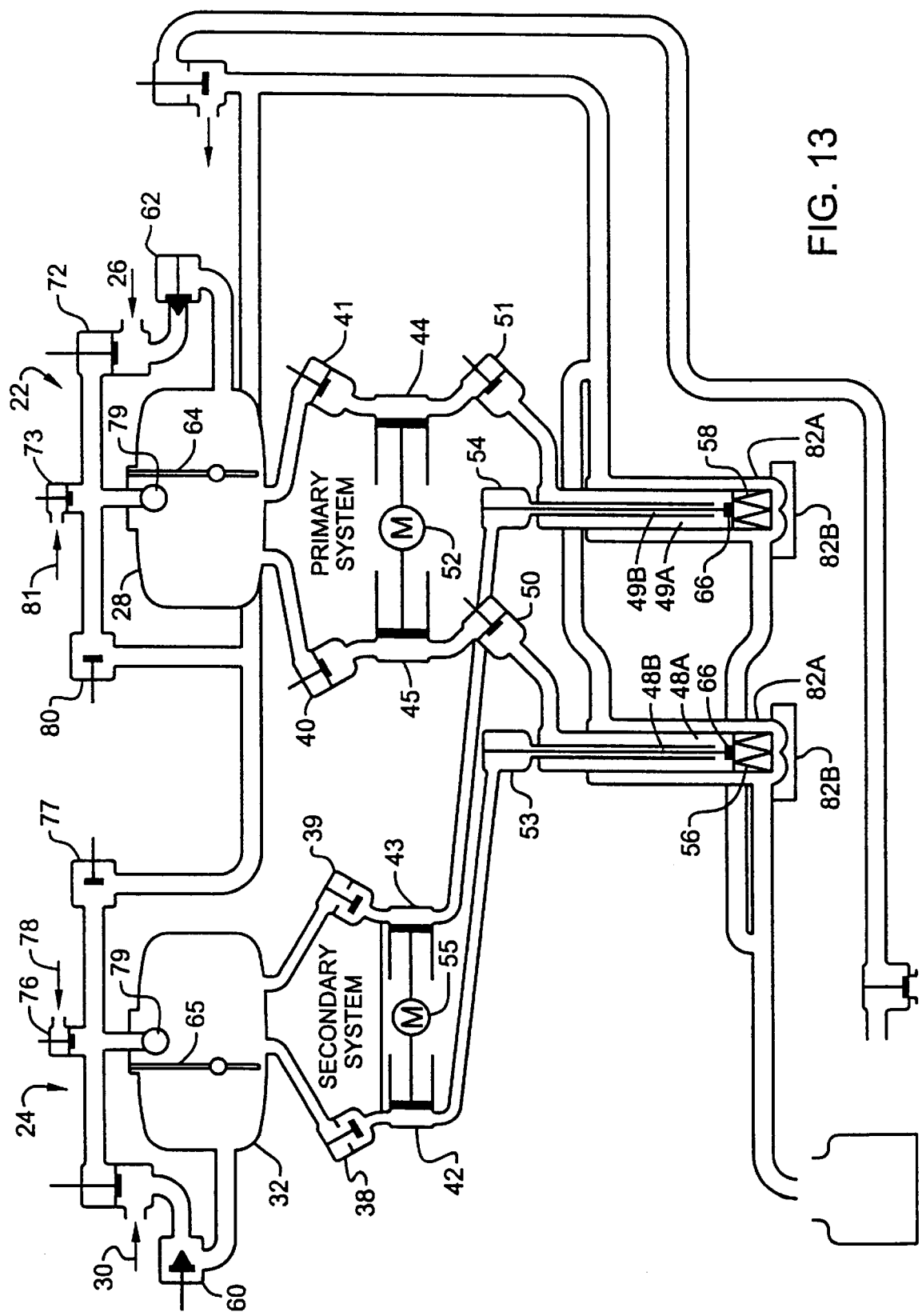
Figure 14:
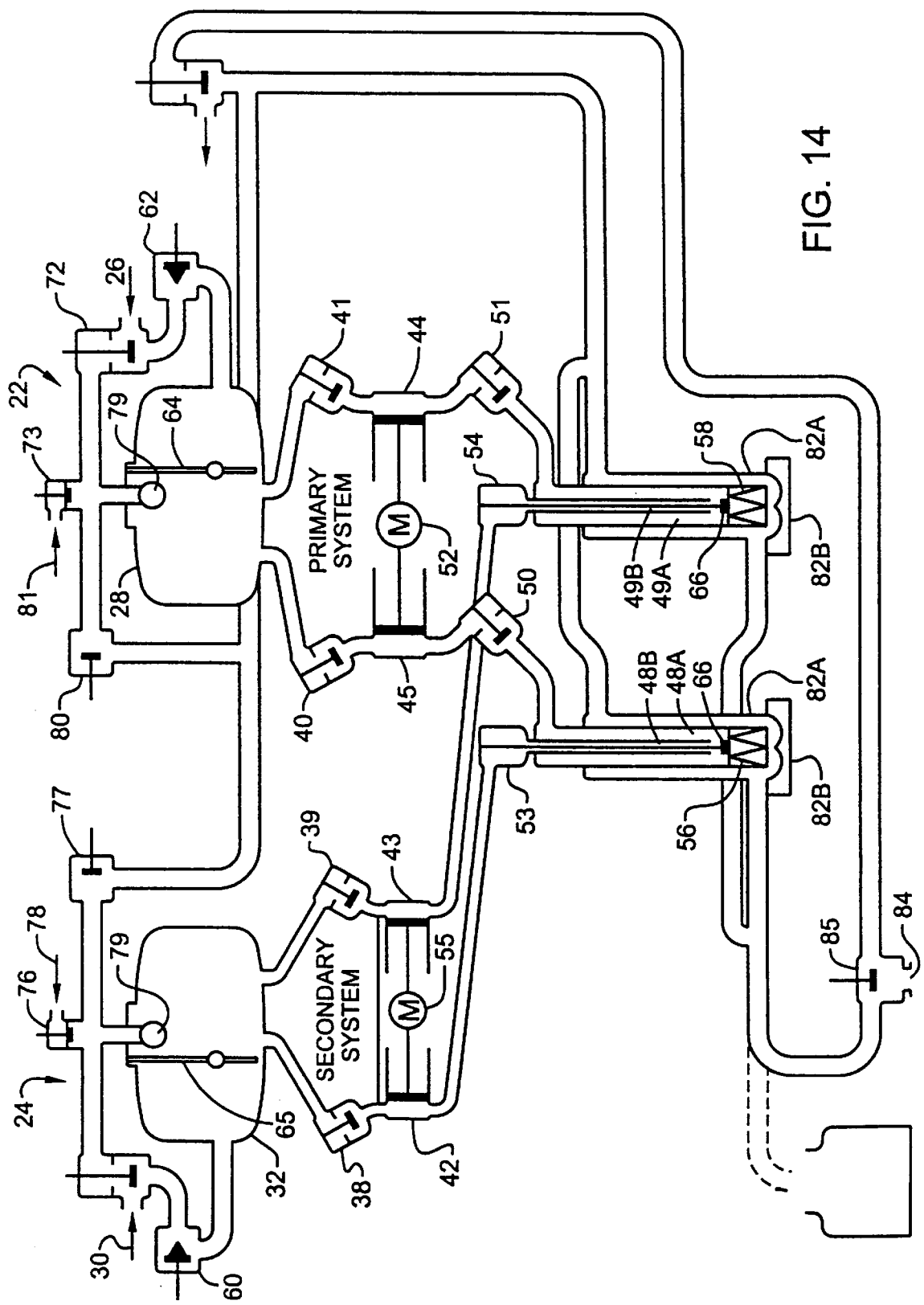

FIG. 12–14 are schematic illustrations of the system configurations that are utilized during various draining processes. More specifically, FIG. 12 illustrates the system configuration during draining of the primary product. As shown, valves 62, 80, 40, 41, 50, 51 of the primary system 22 are open. In addition, a cleaning sleeve 82A is disposed about the primary fill pipes 48A, 49A. A cleaning cover 82B is mounted proximate the cleaning sleeve 82A to surround each of the sealing nozzles 56, 58 during a cleaning operation of the fill systems 20.

FIG. 13 illustrates the system configuration during draining of the secondary product. As illustrated, valves 60, 77, 38, 39, 53, 54 of the secondary system 24 are open. The cleaning covers 82B are also in place. FIG. 14 illustrates the system configuration during draining of water from the system after, for example, a system flush. As shown, a drain outlet 84 is opened via a drain valve 85.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A fill system in a packaging machine for filling a container with a primary product and a secondary product, the fill system comprising:

a primary intermediate storage tank having an inlet connected to a source of the primary product and an outlet;

a primary fill pipe having an inlet and an outlet, the outlet overlying a container processing path along which containers are filled and sealed by the packaging machine;

a primary pump for pumping a predetermined amount of the primary product from the outlet of the primary intermediate storage tank to the inlet of the primary fill pipe;

a primary valve located between the primary intermediate storage tank and the primary pump for controlling flow of the primary product from the primary intermediate storage tank;

a secondary intermediate storage tank having an inlet connected to a source of a secondary product and an outlet;

a secondary fill pipe being concentrically disposed in the primary fill pipe and having an outlet overlying the product container processing path; a secondary pump for pumping a predetermined amount of the secondary product from the outlet of the secondary intermediate storage tank to the secondary fill pipe;

a secondary valve located between the secondary intermediate storage tank and the secondary pump for controlling flow of the secondary product from the secondary intermediate storage tank; and a valve including a sealing member disposed at the outlet of the of the secondary fill pipe for controlling the flow of the secondary product from the secondary fill pipe.

2. The fill system of claim 1 wherein the primary product is skim milk and the secondary product is cream.

3. The fill system of claim 2 wherein the cream is dispensed into the container prior to the time that the skim milk is dispensed by the primary pump through the primary fill pipe and into the container to dampen any foaming of a resulting milk mixture in the container.

4. The fill system of claim 1 further comprising:

a nozzle connected at the outlet of the primary fill tube.

5. The fill system of claim 4 wherein the nozzle is formed from a generally flexible material.

6. The fill system of claim 4 further comprising:

a cleaning sleeve disposed about the primary fill pipe.

7. The fill system of claim 6 further comprising:

a cleaning cover for sealing an end of the cleaning sleeve proximate the nozzle.

8. The fill system of claim 1 further comprising:

means for sensing a level of the primary product in the primary intermediate storage tank; and means for sensing a level of the secondary product in the secondary intermediate storage tank.

9. The fill system of claim 1 wherein the primary valve and the secondary valve are inclined relative to the primary fill pipe.

10. The fill system of claim 1 wherein the primary valve means and the secondary valve means are inclined at an acute angle relative to the primary fill pipe.

11. The fill system of claim 1 further comprising:

a further primary valve located between the primary pump and the primary fill pipe for controlling flow of primary product to the primary fill pipe; and a further secondary valve located between the secondary pump and the secondary fill pipe for controlling flow of the secondary product to the secondary fill pipe.

12. A fill system in a packaging machine for filling a container with a primary product and a secondary product, the fill system comprising:

a primary intermediate storage tank having an inlet connected to a source of the primary product and an outlet;

a primary fill pipe having an inlet and an outlet the outlet, overlying a container processing path along which containers are filled and scaled by the packaging machine;

a primary pump for pumping a predetermined amount of the primary product from the outlet of the primary intermediate storage tank to the inlet of the primary fill pipe;

a primary valve located between the primary pump and the primary fill pipe for controlling flow of primary product to the primary fill pipe;

a secondary intermediate storage tank having an inlet connected to a source of a secondary product and an outlet;

a secondary fill pipe being concentrically disposed in the primary fill pipe and having an outlet overlying the product container processing path;

a secondary pump for pumping a predetermined amount of the secondary product from the outlet of the secondary intermediate storage tank to the secondary fill pipe;

a secondary valve located between the secondary pump and the secondary fill pipe for controlling flow of secondary product to the secondary fill pipe wherein the primary valve and the secondary valve are inclined at an angle relative to the primary fill pipe.

\* \* \* \* \*